(12) United States Patent
Timmons et al.

(10) Patent No.: US 10,815,141 B2
(45) Date of Patent: Oct. 27, 2020

(54) GRAVITY-FED WATER FILTER AND PURIFIER

(71) Applicants: Mark Stephen Timmons, Indianapolis, IN (US); Jeffrey Allen Benz, Indianapolis, IN (US)

(72) Inventors: Mark Stephen Timmons, Indianapolis, IN (US); Jeffrey Allen Benz, Indianapolis, IN (US)

( * ) Notice: Subject to any disclaimer, the term of this patent is extended or adjusted under 35 U.S.C. 154(b) by 305 days.

(21) Appl. No.: 15/815,874

(22) Filed: Nov. 17, 2017

(65) Prior Publication Data

US 2018/0222783 A1 Aug. 9, 2018

Related U.S. Application Data

(60) Provisional application No. 62/564,007, filed on Sep. 27, 2017, provisional application No. 62/423,277, filed on Nov. 17, 2016.

(51) Int. Cl.
*C02F 9/00* (2006.01)
*B01D 29/01* (2006.01)
(Continued)

(52) U.S. Cl.
CPC ............. *C02F 9/005* (2013.01); *B01D 15/00* (2013.01); *B01D 29/01* (2013.01); *B01D 29/036* (2013.01); *B01D 29/56* (2013.01); *B01D 29/58* (2013.01); *C02F 1/003* (2013.01); *B01D 2201/02* (2013.01); *C02F 1/002* (2013.01); *C02F 1/283* (2013.01); *C02F 1/505* (2013.01);
(Continued)

(58) Field of Classification Search
CPC ...... C02F 9/005; C02F 1/003; C02F 2101/22; C02F 1/505; C02F 2303/04; C02F 2307/02; C02F 1/283; C02F 1/002; C02F 2101/322; C02F 1/006; C02F 1/28; C02F 1/281; C02F 1/50; C02F 2307/04; C02F 2307/10; C02F 2303/24; C02F 2101/20; C02F 2101/305; B01D 29/036; B01D 29/58; B01D 29/01; B01D 29/56; B01D 15/00; B01D 2201/02
USPC ......................................................... 217/283
See application file for complete search history.

(56) References Cited

U.S. PATENT DOCUMENTS

X8374 I1 * 8/1834 Wiseman ....................... 210/283
219,817 A * 9/1879 Jewett ........................ C02F 1/42
210/284
(Continued)

OTHER PUBLICATIONS

Fewtrell, Lorna. Silver: water disinfection and toxicity. Centre for Research into Environment and Health. Spring 2014.

*Primary Examiner* — David C Mellon
(74) *Attorney, Agent, or Firm* — Indiano Law Group, LLC; E. Victor Indiano; John T. Woods

(57) ABSTRACT

A gravity-fed filtration apparatus includes a filter housing having a water inlet near an upper portion of the filter housing and a water outlet near a lower portion of the filter housing. A water filter having a plurality of discs is removably stacked within an interior cavity of the filter housing between the water inlet and the water outlet. An outer perimeter portion of each of the plurality of discs sealingly engages with an inner surface of the filter housing. A first disc of the plurality of discs comprises a first plurality of diffusers and a disinfectant media. A second disc of the plurality of discs comprises a mesh. The lower portion of the filter housing is configured to be disposed in the mouth of a water vessel.

19 Claims, 9 Drawing Sheets

(51) Int. Cl.
*B01D 29/56* (2006.01)
*B01D 29/03* (2006.01)
*B01D 29/58* (2006.01)
*C02F 1/50* (2006.01)
*C02F 1/28* (2006.01)
*B01D 15/00* (2006.01)
*C02F 1/00* (2006.01)
*C02F 101/22* (2006.01)
*C02F 101/32* (2006.01)

(52) U.S. Cl.
CPC .... *C02F 2101/22* (2013.01); *C02F 2101/322* (2013.01); *C02F 2303/04* (2013.01); *C02F 2307/02* (2013.01)

(56) References Cited

U.S. PATENT DOCUMENTS

| | | | | |
|---|---|---|---|---|
| 773,946 | A | * 11/1904 | Langill | C02F 1/003 210/266 |
| 2,605,901 | A | * 8/1952 | Morrison | B01D 27/02 210/282 |
| 4,983,286 | A | * 1/1991 | Inagaki | C02F 1/002 210/257.1 |
| 5,830,360 | A | * 11/1998 | Mozayeni | C02F 1/003 210/651 |
| 10,227,244 | B2 | * 3/2019 | King | C02F 1/002 |
| 2006/0266691 | A1 | * 11/2006 | Cheng | C02F 1/006 210/266 |
| 2007/0259144 | A1 | 11/2007 | Mankovitz | |
| 2008/0203007 | A1 | 8/2008 | Jang et al. | |
| 2009/0145839 | A1 | 6/2009 | Miga, Jr. | |
| 2009/0173673 | A1 | 7/2009 | Pritchard | |
| 2012/0255890 | A1 | 10/2012 | Cumberland | |
| 2013/0032566 | A1 | 2/2013 | Lee | |
| 2013/0264262 | A1 | 10/2013 | Closi, Jr. et al. | |
| 2013/0277290 | A1 | 10/2013 | Cumberland | |
| 2014/0027365 | A1 | 1/2014 | Lee | |
| 2014/0120148 | A1 | 5/2014 | Chis | |
| 2015/0014252 | A1 | 1/2015 | Justus, Sr. | |
| 2015/0232318 | A1 | 8/2015 | Meldeau | |
| 2016/0031721 | A1 | 2/2016 | Kellam et al. | |
| 2016/0257583 | A1 | 9/2016 | Chis | |
| 2017/0128863 | A1 | * 5/2017 | Hull | B01D 29/03 |

* cited by examiner

GRAVITY-FED WATER FILTER AND PURIFIER

CROSS REFERENCE TO RELATED APPLICATIONS

The present application claims the benefit of U.S. Provisional Application No. 62/423,277, filed Nov. 17, 2016 and U.S. Provisional Application No. 62/564,007, filed Sep. 27, 2017 the entire contents of which are incorporated herein by reference.

TECHNICAL FIELD

The invention relates to gravity-fed filtration systems, and more specifically to a gravity-fed filtration systems which include an antimicrobial agent.

BACKGROUND

There are a number of published U.S. patent applications related to water vessels incorporating various types of filtration systems, such as the following:

US Patent Application Publication 2008/0203007 to Jang et al. entitled "PORTABLE WATER FILTRATION DEVICE" discloses: a portable water filtration device in which a filter cartridge having a water purifying function is mounted in a water bottle, including a body, which has an inlet in its upper portion and is made of an elastically deformable material, a lid, which is coupled with the body and has a discharge hole, through which water is discharged, a filter cartridge, which is coupled with the lid and has an outflow part from which the water is discharged, inflow holes through which the water enters, and a filter, and a filter housing, which is open in its upper portion for insertion of the filter cartridge into the filter housing. Thus, the portable water filtration device is easy to carry outdoors and is convenient to use because it does not require a separate pressurizer.

US Patent Application Publication 2009/045839 to Miga entitled "Water Bottle with Filtration Feature" discloses: a flexible water vessel is provided that includes an approach for filtering unfiltered water within the bottle. The bottle includes a filter assembly located within the cap of the vessel such that the filter assembly need not descend into the bottle cavity when the cap is screwed on, thereby not displacing water while screwing on the cap. The filter assembly has an axial flow orientation. An illustrated filter assembly includes paper filters covering the upper and lower ends and can include an activated charcoal filter in between the paper filters. Water is filtered when pressure generated by squeezing the bottle forces water from the vessel cavity through the filter along an axial flow path and out through a spout.

US Patent Application Publication 2009/0173673 to Pritchard entitled "FLUID DELIVERY DEVICE" discloses: a container for liquids, in which pressurization of the container is used to force the liquid through one or more membranes to an output. The membranes are disposed across substantially an entire length of the container, and pass liquid in preference to air. As a result, the liquid may be extracted from the container in any orientation. A particular use for this kind of container is as a portable water bottle containing a filter.

US Patent Application Publication 2010/0170839 to Kohl entitled "Water bottle with filter" discloses: a disposable and recyclable water bottle formed of a non-toxic plastic composition includes a flexible sidewall, a neck with an open top and cap, and an open bottom end. A filter cartridge is received within the open bottom and contains activated carbon sandwiched between 0.7 to 50 microns filtration membranes, all contained between upper and lower perforated plates. A lower portion of the filtration cartridge provides a filling chamber for receiving a flow of unfiltered water on to the lower perforated plates for passage through the filter. An arrangement of slots in the walls of the filling chamber allows a portion of the flowing water to bypass the filter in order to prevent overflow when filling the bottle. A cap containing internal screw threads attaches to the external screw threads of the open bottom end, sealing the interior of the bottle. Once sealed, the contained water is allowed to move around in a fluid motion between the interior of the bottle and the filling chamber.

US Patent Application Publications 2012/0255890 and 2013/0277290 to Cumberland entitled "Portable Water Filter" discloses: a portable water filter. A portable water filter may filter water that enters through a first opening disposed toward a first end of the filter, where the water may pass through a filter element and exit the filter through a second opening disposed at or toward the first end of the filter. The first opening may be defined in a surface of the filter that is free of openings toward a second end of the filter. As such, when the filter is inserted into an opening or outlet of a bottle, more of the water in the bottle may be filtered and drained with reduced aeration as the first opening in the filter is disposed toward the opening or outlet in the bottle. The portable water filter may enable the flow of water through the filter element to be more uniform across the length of the filter element.

US Patent Application Publication 2013/0032566 to Lee entitled "COMPOUND SPORTS WATER BOTTLE" discloses: a compound sports water bottle includes a bottle body having an opening forming a fastening section and a bottle cover that includes a counterpart fastening section. The bottle cover includes a tube that extends through the cover. The tube has an end over which a slidable cover is movably fit, whereby the movement of the slidable cover forms an outlet opening. The tube has an opposite end to which a filter element forming a passage is coupled. As such, liquid contained in the bottle body is allowed to be filtered by the filter before flowing out of the bottle through the passage, so that the liquid can be drunk in a concern-free manner.

US Patent Application Publication 2013/0264262 to Closi et al. entitled "UNIVERSAL. FILTER SYSTEM AND METHOD FOR FLUID CONTAINERS" discloses: a universal filter system is provided for filtering a fluid in a fluid container, such as water in a water bottle. The system can be selectively attached to and removed from a plurality of fluid containers. For instance, the filter system can be applied to a first fluid container. After use, the filter system can be removed from the first fluid container. The filter system can then be used in connection with the first fluid container again or with a different fluid container. The filter system can include a filter and one or more container-engaging elements that are configured to sealingly engage a portion of a plurality of fluid containers, including interior and/or exterior portions of such fluid containers. In this way, the leakage of a fluid from the container can be prevented and the fluid must pass through the filter before exiting the outlet of the fluid container.

US Patent Application Publication 2014/0027365 to Lee entitled "PORTABLE FILTRATION WATER BOTTLE" discloses: a portable filtration water bottle, comprising: a bottle body having a connection portion at the bottle entrance; and a bottle cap having an opposite connection portion; wherein a protrusion portion having a through hole in the center is set on the bottle cap. Two opposite sides of the periphery of the protrusion portion are set with two axial bodies respectively, wherein the axial bodies are pivoted with a curved cover. And, the central through hole of the protrusion portion is inserted with a soft tube which has a filtration element set in the other end. By this configuration, a user can safely drink with ease through the filtration by the filter when sucking to draw out the beverage contained in the bottle body.

US Patent Application Publication 2015/0014252 to Justus entitled "WATER BOTTLE COUPLED WITH FILTRATION DEVICE" discloses: a Water bottle coupled with a filtration cartridge including a plastic reservoir sufficiently flexible so that it can be gripped and squeezed, a drinking cap removably attached to the reservoir, a replaceable filtering element removably coupled with the drinking spout portion of the cap through which water inside the reservoir passes before being released through the spout. The removable filter includes and entry and an exit layer of felt and a layer of activated charcoal mixed with zeolite to reduce chlorine, trihalomethanes, organochlorines and heavy metals. The reservoir can fits into a magnetized base which can also be embedded in the body of the reservoir, and a cover to cover the cap and spout which dispenses purified water to the consumer.

US Patent Application Publication 2015/0232318 to Meldeau entitled "Bottle Cap Dispenser with Re-attachable Perforated Cartridge Chamber" discloses: a bottle cap dispenser for administering doses of soluble consumables in conjunction with a water bottle. The bottle cap dispenser includes a bottle dispensing cap and a cartridge chamber removably attached to one other. The bottle dispensing cap provides a means for attaching the bottle cap dispenser to a water bottle, while the cartridge chamber provides a receptacle for retaining the soluble consumables. The cartridge chamber is attached below the bottle dispensing cap and has a plurality of perforations, which allows water to enter the cartridge chamber and dissolve the soluble consumables. The water is then dispensed through a spout of the bottle dispensing cap. A filter assembly may also be attached to the cartridge chamber opposite the bottle dispensing cap. A filter casing is attached to the cartridge chamber, while a filter material positioned within the filter casing removes impurities and contaminants from the water.

US Patent Application Publication 2016/0031721 to Kellam et al, entitled "GRAVITY-FED AND DUAL ION-EXCHANGE WATER FILTRATION BOTTLE" discloses: systems, devices, and methods of filtering water utilize an integrated gravity-fed, dual ion-exchange filtration bottle. Flow-through multi-stage filtration technology is applied to a personal water bottle. The system filters water from an upper unfiltered water reservoir through a multi-stage filter to a lower filtered water reservoir. A user then drinks from the lower reservoir. The bottle includes a cap with a filtered water outlet through which filtered water in the lower reservoir is accessed with a straw, spout, or other access device. The cap includes an unfiltered water inlet to allow filling and refilling of the upper reservoir without disassembling the bottle. The bottle includes a filter vent that eliminates air locks and partial vacuum that can develop when unfiltered water drains from the upper reservoir through the filter to the lower reservoir. This gravity-fed dual ion-exchange filtration system allows for more complete removal of dissolved solids.

While silver has been known to have antibacterial properties since Roman times, its use in a range of experimental drinking-water treatments was only recently addressed by Lorna Fetrell in "Silver: Water Disinfection and Toxicity," *Center for Research into Environment and Health*, Spring 2014. US Patent Application Publication 2007/0259144 to Mankovitz entitled "Silver/plastic combination that binds hazardous agents and provides anti-microbial protection" discloses: a plastic water bottle that is molded with ionic silver therein that acts as a binding agent for hazardous leaching elements found in the plastic, such as bisphenol-A, and that also imparts anti-microbial properties, well known to exist with colloidal ionic silver, to the water stored in the bottle as well as the person holding the bottle.

Recently, Christian Chis of Claire Technologies, LLC invented new antimicrobial materials of titanium oxide and silver salts having superior and unexpected performance properties over known materials. This new disinfection media is marketed in the USA through the authorized distributor U.S. Water Systems, Inc. under the tradename Pulsar™ Quantum Disinfection™. These new materials are covered by one or both of the following published US patent applications:

US Patent Application Publication 2014/0120148 to Chis entitled "ANTIMICROBIAL MATERIAL AND USES THEREOF" discloses: "An antimicrobial material, antimicrobial devices and method of reducing or eliminating microorganisms from a fluid susceptible to contain microorganisms is presented. The antimicrobial material is comprised of a porous activated ceramic substrate; a titanium dioxide layer covalently bound to the ceramic substrate; and a silver salt layer covalently bound to the titanium oxide layer. This antimicrobial material is used in the antimicrobial devices and methods to reduce or eliminate microorganisms in fluid.

US Patent Application Publication 2016/0257583 to Chis entitled "DISINFECTION COMPOSITIONS AND METHODS" discloses: disinfection compositions, devices, systems and methods useful for decontamination and/or disinfection of water and other liquid solutions. The disclosed composite materials can comprise a germicidal surface comprising a support substrate, one or more micrometric aggregates of titanium oxide on the support substrate, the titanium oxide aggregates comprising chloride atoms, and one or more micrometric aggregates of silver attached to the chloride atoms of the titanium oxide aggregates, wherein the micrometric aggregates of titanium oxide with silver atoms have a germicidal activity. Methods of using the same for reducing or eliminating microorganisms in water or a fluid can comprise contacting water or fluid with microorganisms with the composite material, wherein the microorganisms in the water or fluid are reduced or eliminated from the water or fluid.

There are many drawbacks associated with the prior art. For example, in some applications dirty water is stored within the container, in other applications there exists a likelihood that clean water will be contaminated with dirty water under typical field conditions, in yet further applications there is insufficient lag time within the filter media to provide sufficient filtration. Accordingly, there remains a need for further contributions in this area of technology.

SUMMARY

The present invention relates to a new gravity-fed water filtration system comprising a funnel-shaped filtration component having a horizontal layer of antimicrobial material comprising titanium oxide and a silver salt.

In a 1$^{st}$ aspect the present invention provides a gravity-fed filtration water vessel system comprising: a funnel filtration component, a water vessel component, and a removable cap, wherein:
the water vessel component comprises an upper rim, body, and base;
the funnel filtration element comprises a wide upper rim, conical body, and narrow lower rim;
the funnel filtration component is positioned inside the water vessel with its upper rim in contact with the upper rim of the water bottle component; the removable cap is positioned over the upper rim of water vessel component; and the funnel filtration element comprises a horizontal layer of disinfectant media.

In another embodiment, the removable top cap is attached by threads on the inside of the cap to threads on the outside of the body of the water vessel component.

In another embodiment, the removable cap is attached by a snap fit over the upper rim of the water vessel component.

In another embodiment, the base of the water vessel component is solid and substantially flat.

In another embodiment, the body of the water vessel component is substantially cylindrical and the base is solid and substantially flat.

In one embodiment, the funnel filtration element further comprises a horizontal layer of activated carbon above the horizontal layer of disinfectant media.

In another embodiment, the funnel filtration element further comprises a horizontal layer of sand above the horizontal layer of disinfectant media.

In another embodiment, the funnel filtration element further comprises a horizontal layer of sand, above a horizontal layer of activated carbon, above the horizontal layer of disinfectant media.

In another embodiment, the disinfectant media comprises titanium oxide and a silver salt.

In another embodiment, the disinfectant media is a composite material with a germicidal surface comprising: a support substrate; one or more micrometric aggregates of titanium oxide on the support substrate, the titanium oxide aggregates comprising chloride atoms; and one or more micrometric aggregates of silver attached to the chloride atoms of the titanium oxide aggregates, wherein the micrometric aggregates of titanium oxide with silver atoms have a germicidal activity.

In another embodiment, the support substrate comprises a silica gel or activated alumina, wherein the support substrate comprises a surface area of at least 50 m.sup.2/g and not more than 850 m.sup.2/g.

In another embodiment, the aggregates of titanium oxide with chloride atoms are of a size greater than about 250 nm and up to about 10,000 nm and cover partially the surface of the support substrate.

In another embodiment, the of aggregates of titanium oxide with chloride atoms comprise no more than about 5 to about 7% by weight of the composite material.

In another embodiment, the silver aggregates are larger than about 250 nm and up to about 1,000 nm and cover at least partially the support substrate.

In another embodiment, the silver aggregates are not more than about 15% by weight of the composite material.

In another embodiment, the silver aggregates consist of metallic silver.

In another embodiment, the disinfectant media comprises Quantum Disinfection™ medium.

In a 2$^{nd}$ aspect the present invention provides a gravity filtration water vessel system comprising: a funnel filtration component, a water vessel component, a removable top cap, and a removable bottom cap, wherein:
the water vessel component comprises an upper rim; body; and lower rim;
the funnel filtration element comprises a wide upper rim, conical body, and narrow lower rim;
the funnel filtration component is positioned inside the water vessel with its upper rim in contact with the upper rim of the water vessel component;
the removable top cap is positioned over the upper rim of the water vessel component; and
the removable bottom cap is positioned over the upper rim of the water vessel component; and the funnel filtration element comprises a horizontal layer of disinfectant media.

In another embodiment, the body of the water vessel component is substantially cylindrical in shape.

In another section, the body of the water vessel component is substantially cylindrical in shape with a neck section between the body and the lower rim.

In another embodiment, the removable top cap is attached by threads on the inside of the cap to threads on the outside of the body of the water vessel component.

In another embodiment, the removable top cap is attached by a snap fit over the upper rim of the water vessel component.

In another embodiment, the removable bottom cap is attached by threads on the inside of the cap to threads on the outside of the body of the water vessel component.

In another embodiment, the removable bottom cap is attached by threads on the inside of the cap to threads on the outside of the neck of the water vessel component.

In another embodiment, the removable bottom cap is attached by a snap fit over the lower rim of the water vessel component.

In one embodiment, the funnel filtration element further comprises a horizontal layer of activated carbon above the horizontal layer of disinfectant media.

In another embodiment, the funnel filtration element further comprises a horizontal layer of sand above the horizontal layer of disinfectant media.

In another embodiment, the funnel filtration element further comprises a horizontal layer of sand, above a horizontal layer of activated carbon, above the horizontal layer of disinfectant media.

In another embodiment, the disinfectant media comprises titanium oxide and a silver salt.

In another embodiment, the disinfectant media is a composite material with a germicidal surface comprising: a support substrate; one or more micrometric aggregates of titanium oxide on the support substrate, the titanium oxide aggregates comprising chloride atoms; and one or more micrometric aggregates of silver attached to the chloride atoms of the titanium oxide aggregates, wherein the micrometric aggregates of titanium oxide with silver atoms have a germicidal activity.

In another embodiment, the support substrate comprises a silica gel or activated alumina, wherein the support substrate comprises a surface area of at least 50 m.sup.2/g and not more than 850 m.sup.2/g.

In another embodiment, the aggregates of titanium oxide with chloride atoms are of a size greater than about 250 nm and up to about 10,000 nm and cover partially the surface of the support substrate.

In another embodiment, the of aggregates of titanium oxide with chloride atoms comprise no more than about 5 to about 7% by weight of the composite material.

In another embodiment, the silver aggregates are larger than about 250 nm and up to about 1,000 nm and cover at least partially the support substrate.

In another embodiment, the silver aggregates are not more than about 15% by weight of the composite material.

In another embodiment, the silver aggregates consist of metallic silver.

In another embodiment, the disinfectant media comprises Quantum Disinfection™ medium.

It will be appreciated that the funnel filtration component can include a replaceable cartridge with a pre-filter component (e.g., paper filter, sand, activated carbon, or combination thereof) and a disinfectant component. One advantage of this approach is that the pre-filter component can be replaced without having to replace the disinfectant component.

DETAILED DESCRIPTION

Figure 1:
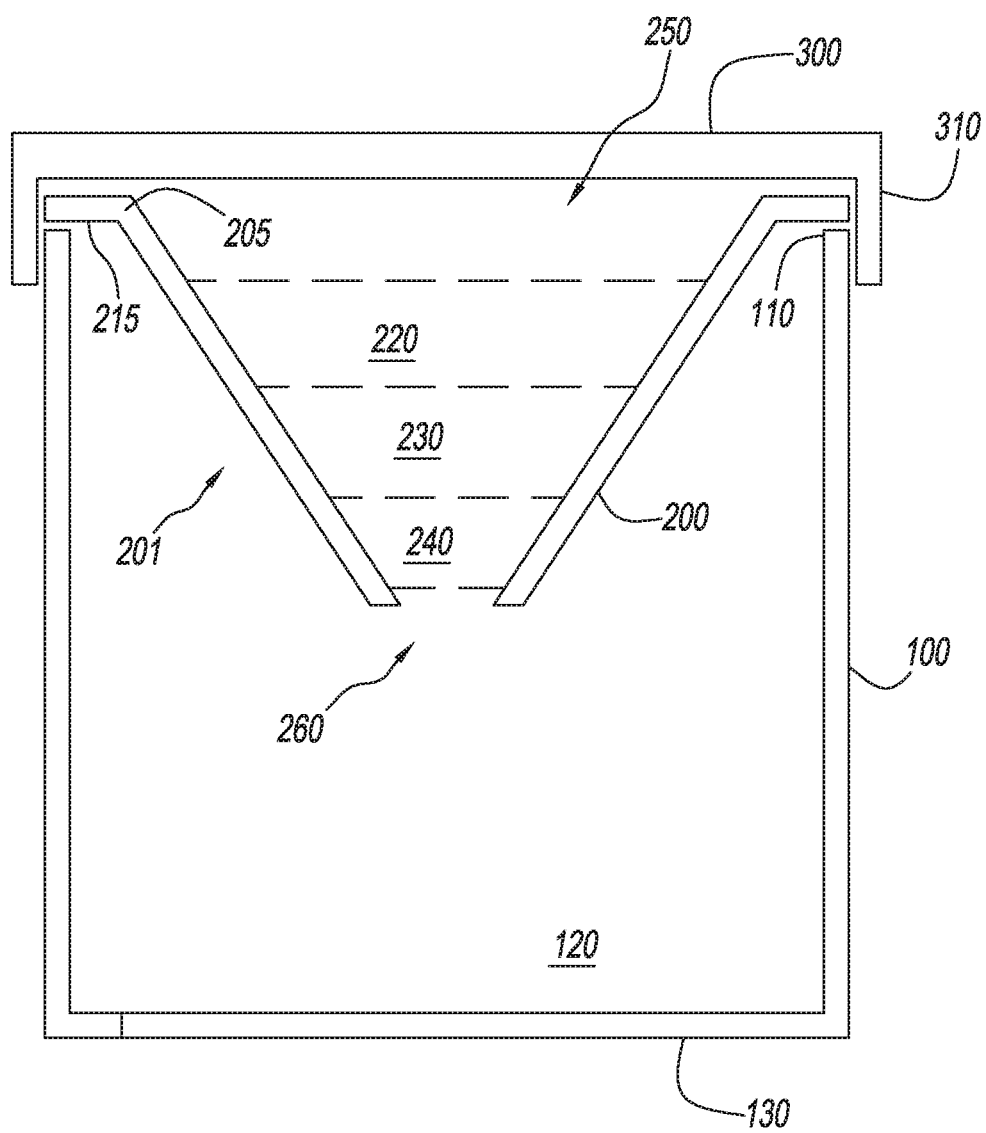
FIG. 1 shows a side cut-away view of one embodiment of a funnel filtration component located atop a water vessel.

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

As Used Herein:

The term "funnel" means a tube or pipe that is wide at the top (upper rim) and narrow at the bottom (lower rim). It can be utilized to channel liquid into containers, including, but not limited to vessels with a small opening. Exemplary funnels can be constructed of stainless steel, aluminum, glass, or plastic. The material used in its construction should be sturdy enough to withstand the weight of the substance being transferred, and it should not react with the substance.

The term "vessel" is a container that is used to hold water, liquids or other beverages for consumption. Water vessels come in a variety of shapes and sized. The term includes a wide variety of containers, such as those containers with a neck that is narrower than the body, as well those containers with a relatively large mouth or opening which may be as wide or wider than the overall container. In one specific form, the term vessel can refer to a water bottle, such as a bottle manufactured by Nalgene. A water bottle allows an individual to transport a beverage from one place to another and drink therefrom. A water bottle is usually made of plastic, glass or metal. Water bottles are available in different shapes, colors and sizes. Water bottles can also be used for liquids such as juice, iced tea, alcoholic beverages or soft drinks. Although the term water bottle and water vessel have been described heretofore, any container suitable for the storage and transport of liquids is contemplated herein.

The term "and/or" when used in the context of a listing of entities, refers to the entities being present singly or in combination. Thus, for example, the phrase "A, B, C and/or D" includes A, B, C and D individually, but also includes any and all combinations and sub-combinations of A, B, C and D.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

Unless defined otherwise, all technical and scientific terms used herein have the same meaning as commonly understood to one of ordinary skill in the art to which the presently disclosed subject matter belongs. Although any compositions, methods, devices, and/or materials similar or equivalent to those described herein can be used in the practice or testing of the presently disclosed subject matter, representative compositions, methods, devices, and/or materials are now described.

Disinfectant Media

In various forms, the filter of the present application includes a disinfectant media which kills or traps various microorganisms, which include, but are not limited to bacteria, virus, parasites, fungus, or the like. In a preferred form, this disinfectant media is able to kill or trap these various microorganisms without the addition of any residues, or "aftertaste" affects, such as are common with many prior art disinfectants such as chlorines. Although specific forms of the disinfectant media are discussed hereinafter, it is contemplated that a variety of disinfectant media capable of antimicrobial activity may be utilized. In another form, it is contemplated that a variety of disinfectant media, which can fully trap microorganisms (e.g. prevent at least 95% of microorganisms from passing therethrough), may be utilized.

In one specific form, the disinfectant media utilized is an electroadsorptive media, such as Ahlstrom Disrupter® nonwoven filter media. This electroadsorptive media utilizes electroadhesion and ion exchange to trap microorganisms within the media, and provides excellent pathogen rejection while operating at high flow and low pressure.

In another specific form, the disinfectant media is described in US Patent Application Publications 2016/

0257583 and 2014/0120148 to Cristian Vasile Chis, and are incorporated herein by reference in their entireties. A relevant portion of US Patent Application Publication 2016/0257583 is herein reproduced:

> Even though all details of the mechanism of action may not be fully understood, the germicidal proprieties of silver (Ag) have been appreciated for some time. Silver has been applied in forms of colloidal silver (Cecil W. Chambers et al., Ind. Eng. Chem., 1953, 45 (11), 2569-2571), or more recently, as silver nanoparticles (Mahendra Rai et al., 2009, Biotechnology Advances, 27(1), 76-83). Unfortunately, all of these forms are still used as chemical additions to water. Even silver compounds on supports (Shuting Zhang et al., 2004, Carbon, 42(15), 3209-3216; Xiaole Zhang et al., 2011, Colloids and Surfaces A: Physicochemical and Engineering Aspects, 375(1-3), 186-192; R. K. Sharma et al., 1990, Journal of Environmental Science and Health. Part A: Environmental Science and Engineering and Toxicology, 25(5), 479-486; Bright Kwakye-Awuah et al., 2007, Journal of Applied Microbiology, ISSN 1364-5072), all of which are considered as silver dispensers, are highly limited by the difficulty of bonding silver particles to supports and, at the same time, keeping their germicidal activities. If made to be too stable such compounds can have no or limited germicidal activity, while insufficient stability of the silver particles can cause silver leaching. This balance between the silver stability and its germicidal activity condemns, for now, those materials to remain at laboratory scale. US Patent Application Publication 2016/0257583, Para. [0040].
>
> Disclosed herein is a material that allows a high silver stability together with a high germicidal activity that permits the disinfection of water and other media without any (or substantially no) chemical addition. The disclosed materials further provide germicidal active surfaces on composite materials. US Patent Application Publication 2016/0257583, Para. [0041].
>
> The present disclosure describes composite materials or compounds that, by their particular chemical composition and chemical bounding, allows a high stability of silver active aggregates at the surface of the material, which provides germicide capacities to the material itself. Also, the present disclosure describes methods and chemical compositions of the ingredients that can provide for the formation and the stability of the silver active aggregates at the surface of the composite material. Moreover, the present disclosure describes conditions under which the composite material with germicidal surfaces functions as a water (or other liquid media) disinfectant. US Patent Application Publication 2016/0257583, Para. [0042].
>
> It can be difficult to chemically bond silver (in any form) to ceramics or other porous materials and, at the same time, keep the germicide capacities of the silver. In other words, if the silver is to bond to the support (in techniques like adding silver nanoparticles in the support row material as previously step in the support manufacturing process, etc.), the silver may no longer have germicide proprieties after being bonded to the support. Therefore, the only option remaining is the physical adsorption of silver nanoparticles on porous supports or their creation in situ on the porous supports from silver solutions, and like this, the created silver nanoparticles will be physically linked to the supports. In all these cases, the materials are actually dispensers of active silver nanoparticles. From this perspective, the aim of the present disclosure is the presence of the titanium dioxide aggregates with chlorine atoms embodied into the TiO structure and acting as chemical "nails" between the porous supports and silver aggregates. US Patent Application Publication 2016/0257583, Para. [0052].
>
> Without being restricted by any theoretical or analytical interpretation, applicant has found that at least one method of growing in situ the TiO micro-aggregates is the Chemical Vapour Deposition—Molecular Layering technique. Additionally, applicant has found that in some embodiments where a titanium dioxide precursor is strictly used, titanium chloride (TiCl.sub.4) can be used in order to provide the chloride residue atoms that will chemically attach, i.e. "nail" the silver. US Patent Application Publication 2016/0257583, Para. [0053].
>
> In some embodiments, the TiO aggregates with Cl atoms in their structure are partially or totally crystallized in anatase structures. US Patent Application Publication 2016/0257583, Para. [0054].
>
> In other embodiments, the TiO aggregates with Cl atoms in their structure can be 0.5, 1, 2, 3, 4, 5, 6, 7, 8, 9, 10, 11, 12, 13, 14 or 15 microns in size. In some other embodiments the TiO aggregates with Cl atoms in their structure are between about 5 and about 8 micrometers in size, more precisely 6.5 µm. US Patent Application Publication 2016/0257583, Para. [0055].
>
> In some embodiments, the TiO aggregates with Cl atoms in their structure are partially or entirely covering the ceramic support surfaces. Applicant found that the more active surfaces are the ones where the TiO aggregates with Cl atoms cover entirely the ceramic surfaces. US Patent Application Publication 2016/0257583, Para. [0056].
>
> In some embodiments the silver nanoparticles can be larger than about 250 nm and can reach up to about 700 nm or even more, e.g. about 1 micrometer. In some embodiments, applicant found that the silver aggregates that are chemically bound to the ceramic surfaces are around 500 nm in size. US Patent Application Publication 2016/0257583, Para. [0058].
>
> In some other embodiments, the silver aggregates can be completely or partially covering the titanium dioxide aggregates. Applicant found that the most active surfaces are the ones where the silver aggregates cover completely the TiO aggregates. US Patent Application Publication 2016/0257583, Para. [0059].
>
> Again, in some embodiments, silver aggregates are partially or entirely crystallized in cubic shapes. Applicant found that the surfaces with the most germicidal activity are the ones in which the silver aggregates are entirely crystallized in cubic shapes. US Patent Application Publication 2016/0257583, Para. [0060].
>
> The present disclosure also describes a method for reducing or completely eliminating microorganisms from water or a fluid comprising a step of bringing the water or fluid into contact with the composite material having germicide surfaces. US Patent Application Publication 2016/0257583, Para. [0067].
>
> In some cases, the microorganisms can comprise bacteria, type Gram+ or Gram−, micro-fungi, micro-algae, yeast or virus or any mixture of those. US Patent Application Publication 2016/0257583, Para. [0068].
>
> Without being restricted by any theoretical interpretation, the composite material with germicide surfaces according to this disclosure can be used for the disinfection of waters like wastewater, grey water, well water, cooling water, condensation water, ballast water, ice production water, drinking water, and industrial water, as well as air, cooling oil or any other fluid, fluids or medium susceptible to contain microorganisms. US Patent Application Publication 2016/0257583. Para. [0069].

The present disclosure thus relates especially to the use of a composite material comprising, in some embodiments, the following components (I), (II) and (III):
(I) a silica gel (or alumina) support, which can provide for in situ growth of
(II) a layer or aggregation of aggregates comprised of titanium dioxide with chloride atoms, type TiO(Cl), which can act as bounding glue for
(III) a silver (Ag) aggregates layer or aggregation which can provide for a germicide surface. US Patent Application Publication 2016/0257583, Paras. [0010]-[0012].

In some embodiments, the porous support forming the part (I) can comprise about 70% to about 90% of the total mass of the composite material. In some embodiments, the adhesive forming the part (II) can comprise about 3% to about 10% of the total mass of the composite material. In some embodiments, the germicide surface forming the part (III) can be comprise from about 10% to about 20% of the total mass of the composite material. US Patent Application Publication 2016/0257583, Para. [0013].

In some embodiments, the porous support can comprise silica gel with a specific area at least 440 m2/g. In other embodiments, the porous support can comprise alumina with a specific area of at least 260 m2/g. US Patent Application Publication 2016/0257583, Para. [0014].

According to another embodiment, aggregates composed of titanium dioxide with chloride atoms type TiO(Cl) can be in very smooth diamond shapes naturally structured and at least 5 to 10 micrometers in size. US Patent Application Publication 2016/0257583, Para. [0015].

According to another embodiment, the silver aggregates can be at least 250 nm in size in order to provide an active germicide surface and can reach, in some embodiments, up to about 500 nm to about 750 nm. US Patent Application Publication 2016/0257583, Para. [0016].

Thus, in some embodiments provided herein are composite materials with a germicidal surface comprising a support substrate, one or more micrometric aggregates of titanium oxide on the support substrate, the titanium oxide aggregates comprising chloride atoms, and one or more micrometric aggregates of silver attached to the chloride atoms of the titanium oxide aggregates, wherein the micrometric aggregates of titanium oxide with silver atoms have a germicidal activity. In some embodiments, the support substrate comprises a silica gel or activated alumina, wherein the support substrate comprises a surface area of at least 50 m.sup.2/g and not more than 850 m.sup.2/g. In some embodiments, the support substrate can comprise a porous ceramic. In some embodiments, the aggregates of titanium oxide with chloride atoms are of a size greater than about 250 nm and up to about 10,000 nm and cover partially the surface of the support substrate. In some embodiments, the aggregates of titanium oxide with chloride atoms comprise no more than about 5 to about 7% by weight of the composite material. US Patent Application Publication 2016/0257583, Para. [0017].

In some embodiments, the silver aggregates are larger than about 250 nm and up to about 1,000 nm and cover at least partially the support substrate. In some embodiments, the silver aggregates are not more than about 15% by weight of the composite material. In some embodiments, the silver aggregates consist of metallic silver, US Patent Application Publication 2016/0257583, Para. [0018].

Provided herein are also methods for reducing or eliminating microorganisms in water or a fluid, comprising providing a composite material and contacting water or fluid with microorganisms with the composite material, wherein the microorganisms in the water or fluid are reduced or eliminated from the water or fluid. In some embodiments, the microorganisms can comprise bacteria type Gram+ or Gram−, micro-fungi, micro-algae, yeast, virus or any combination thereof. In some embodiments contacting the water or fluid with microorganisms comprises providing a device comprising the composite material and a filter, column, bed or structure with an inlet and outlet configured to allow the water or fluid to flow through the device while contacting the composite material. In some embodiments, the water or fluid comprises wastewater, grey water, well water, cooling water, condensation water, ballast water, ice production water, drinking water, industrial water, cooling oil or any other fluid susceptible to contain microorganisms. US Patent Application Publication 2016/0257583, Para. [0019].

Examples of the Present Application

FIG. 1 depicts a side cut-away view of one embodiment of a gravity-fed funnel filtration component 201 positioned on a water vessel 100. The water vessel 100, depicted as a water bottle, includes a substantially flat base 130; an interior reservoir 120, and an upper rim 110.

The funnel filtration component 201 has a conical-shaped body 200, a wide upper rim 205, and a narrow lower rim 210. The upper rim 205 of the funnel filtration component 201 has a flat extension section 215 that sits on the upper rim 110 of the water vessel 100.

A removable cap 300 can secure the funnel filtration component 201 in the water vessel 100, such as during transport. The removable cap 300 may also be utilized to collect water from a source for pouring into funnel filtration component 201. The length of the side lower section 310 of the removable cap 300, along with its diameter, determine the volume of liquid that can be held. The removable cap 300 is depicted as being positioned over the flat extension section 215 of the funnel filtration component 201 and the upper rim 110 of water vessel 100. The cap 300 can be secured to the water vessel 100 in a variety of ways, for example via screw-threads, a snap fit, or the like.

When the removable cap 300 is removed from the water vessel 100, and the funnel filtration component 201 is in an open configuration, water can be added to the funnel filtration component 201. As the water flows through the funnel filtration component 201, the water is filtered and purified and fresh, clean, potable water will exit from the bottom orifice 260 and accumulate in the reservoir 120. When all the water has been filtered, the funnel filtration component 201 can then be lifted out of the vessel 100 and a user can consume the purified water from the water vessel 100.

In use, unfiltered water is added to the upper orifice 250. This unfiltered water travels downward under the force of gravity sequentially through a plurality of filtration layers which are located in an interior of the funnel filtration component. Exemplary layers include an upper horizontal layer or sand 220, a middle horizontal layer of activated carbon 230, and a lower layer of disinfectant media 240. The purified water exits the funnel the bottom orifice 260. In this form, there is a horizontal barrier B1 on top or the sand layer, a horizontal barrier B2 between the sand and carbon layers, a horizontal barrier B3 between the carbon and disinfectant media layers, and horizontal barrier B4 beneath the disinfectant media layer.

Horizontal barrier layers B1-B4 hold the various layers of material in place and keep them separated, while being permeable to water. In one embodiment, horizontal barriers layers B1-B4 are made of a mesh material, such as a screen. However, various forms where one or more of barrier layers B1-B4 are absent, is contemplated within the scope of the present invention. For instance, in one form, B1 and B4 alone are sufficient to perform the required function.

It will be also appreciated that the funnel filtration component 201 can include a replaceable cartridge with a pre-filter component (e.g., paper filter, sand, activated carbon, or combination thereof) and a disinfectant component. One advantage of this approach is that the pre-filter component can be replaced without having to replace the disinfectant component.

Figure 2:
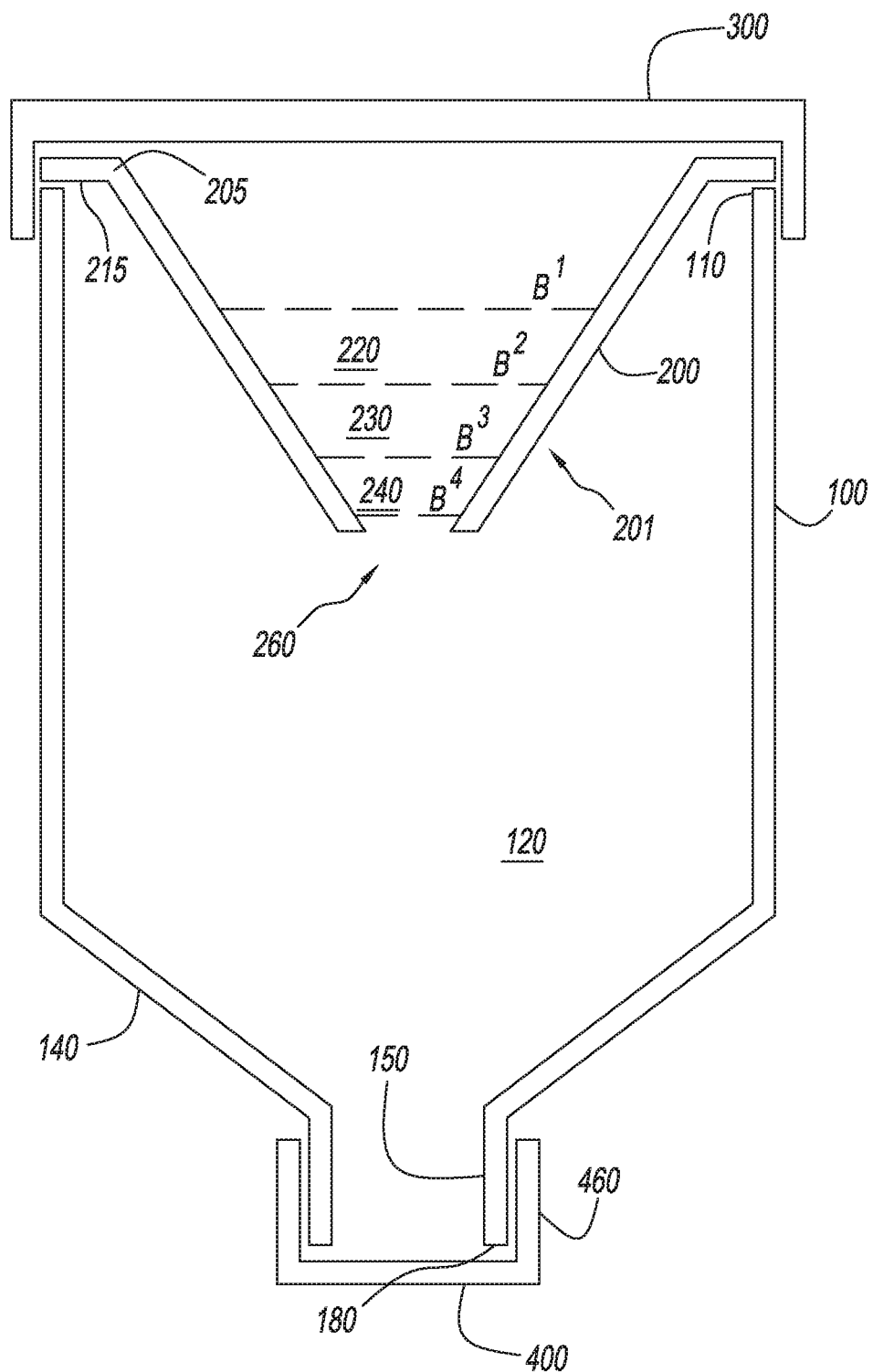
FIG. 2 shows a side cut-away view of another form of a gravity filtration water vessel system comprising a conical funnel filtration element, a water vessel element, a removable upper cap, and a removable bottom cap.

FIG. 2 depicts a cut-away view of another form of a gravity filtration water vessel system having a conical funnel filtration element 201, a water vessel 100, a removable top cap 300, and a removable bottom cap 400. The water vessel 100 includes a shoulder section 140, a neck section 150, an interior reservoir 120, an upper rim 110, and a lower rim 160. As was discussed with regard to FIG. 1, the removable top cap 300 can be utilized to secure the funnel filtration element 201 in the water vessel 100 when the system is not being used in filtration mode, for example during transport.

The removable bottom cap 400 typically includes a circular flat section 400 in contact with the lower rim 150 of the water vessel 100 and a cylindrical surface 410 extending over an outside of the neck 150 of the water vessel 100. The removable bottom cap 400 can be attached to the water vessel 100 via threads, a snap fit, or the like. The removable bottom cap 400 can provide a stable surface for the system to sit on while being used to filter water. Additionally, the bottom cap seals the exit port of the system until ready for use. The diameter of the bottom cap 400 can be varied, for example to optimize stability. When the reservoir contains a sufficient amount of purified water, the user can remove the bottom cap 400 and either drink the water exiting the system or catch the clean water in another container (not shown).

Figure 3:
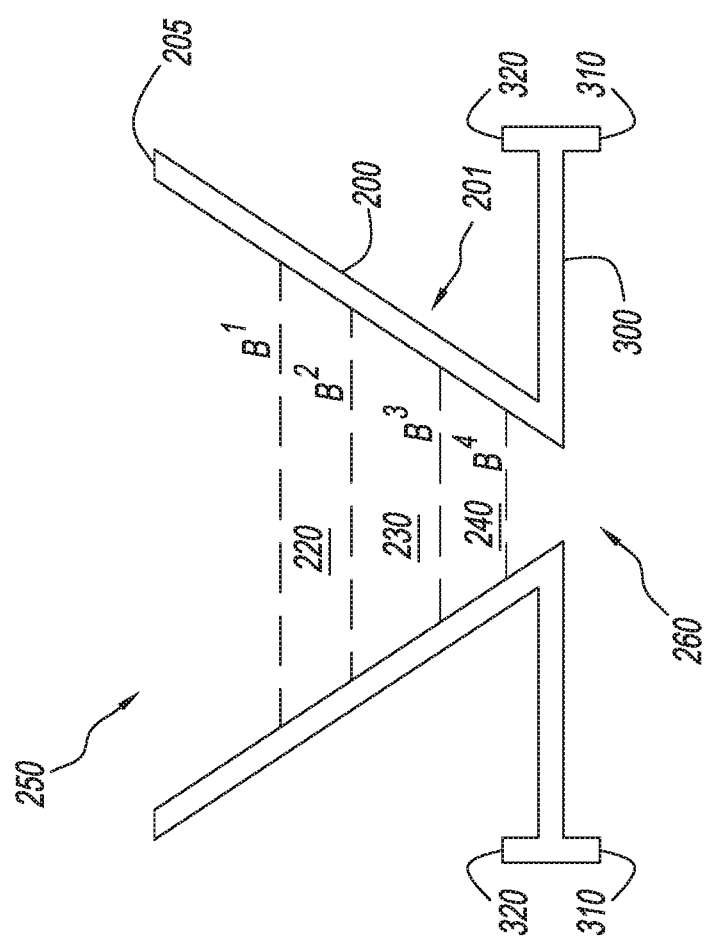
FIG. 3 shows a side cut-away view of another embodiment of a funnel filtration component.

FIG. 3 depicts a side cut-away view of a funnel filtration component having a water vessel cap 300 incorporated into its base. The cap 300 has a lower side section 310 designed to fit over the upper rim a water vessel during use, and an upper side section 320 designed to fit over the upper rim a water vessel when the system is being stored (note that the funnel is flipped upside down and contained within the water vessel during storage).

Figure 4:
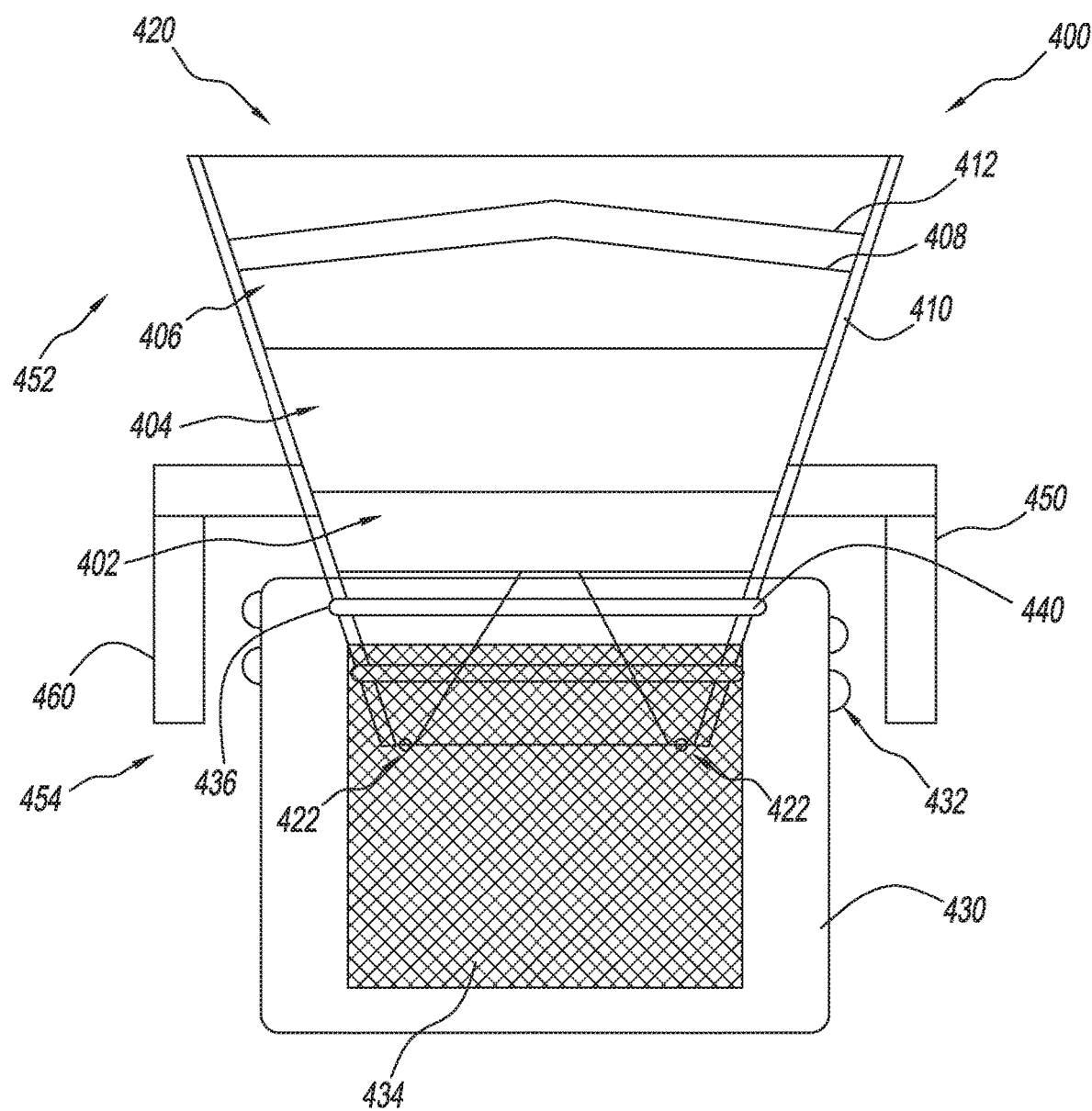
FIG. 4 is a side sectional view of a further embodiment of a filter coupled to a water bottle for receiving filtered and purified water.

FIG. 4 depicts a cut-away view of a further form of a water filtration system, disposed atop a water bottle, as it would appear during use. A filter housing 410 includes an inward taper from an upper portion 452 to a lower portion 454. In a preferred form, the filter housing 410 takes the form of a frustoconical cone 410 having a decreasing diameter between the upper portion 452 and the lower portion 454. This filter housing includes a dirty water inlet 420 located near the wide upper portion 452, one or more clean water outlets 422 located near the narrow lower portion 454, a splash skirt 450, a filter 400, and seal 440.

The water bottle 430 includes an interior cavity 434 capable of holding water therein. The water bottle has a mouth 436 located near an upper portion of the water bottle. The water bottle 430 can include a variety of other common features known to a POSITA, such as threads 432 which are structured to receive and retain a lid (not shown). As was previously discussed, although the vessel 430 is described as a water battle 430, any container suitable for the storage and transportation of water is contemplated herein.

The lower portion 454 of the filter housing 410 is configured to extend into the opening, e.g. mouth 436, of the water bottle 430. Seal 440 is depicted as surrounding an outer circumference of the filter housing 410. This seal can be pressed against an interior surface of the mouth 436 of the water bottle 430 such that sealing engagement is achieved between the filter housing 410 and the water bottle 430. This sealing engagement can reduce the risk that contaminated water would enter the interior 434 of the water bottle 430, thereby contaminating any clean water therein. Moreover, this sealing engagement can help to provide stability to the filter housing 410 during filtration.

To accommodate a variety of water bottle 430 openings, a variety of seals 440 and 442 can be located at various vertical locations along the filter housing 410. Similar to seal 440, seal 442 surrounds the outer circumference of the filter housing 410 and is configured to seal against an inner surface of the mouth 436 of a water bottle. As the filter housing 410 has a conical shape, the vertically lower seal 432 will snugly fit against a smaller opening mouth 436 than will seal 440. Although two seals 440 and 442 have been described herein, more or fewer seals may be incorporated, at a variety of vertical locations to fit any number of desired openings.

A splash skirt 450 shields the opening of the water bottle 430 from dirty water, unprocessed fluid, from entering the water bottle 430. The splash skirt 450 is depicted as extending radially outward and downward from the filter housing 410. The splash skirt 450 prevents dirty water, which may be spilled when pouring water into the dirty water inlet 410, from entering the interior 434 of the water bottle 430. The splash skirt 450 has an outer diameter greater than an outer diameter of the mouth 436 of the water bottle 430. A lip 460 of the splash skirt 450 extends below the lowest seal 442 of the filter housing 410 such that the lip 460 will extend below an outer diameter of the mouth 436. In this manner, should any dirty water be spilled near the mouth 436, the splash skirt 450 will direct such dirty water down from the opening of the water bottle 430 and prevent the dirty water from enter the interior 434 of the water bottle. As would be understood to a POSITA, the dimensions (diameter and length of the lip 460) of the splash skirt 450 will depend upon the specific application, particularly on the types of water bottles to be compatible with the filter system. Although a specific splash skirt 450 has been described herein, any splash skirt design 450 is contemplated which can effectively shield the opening of the water bottle 430 (i.e. a conical design tapering down and out, a flexible sheet, a screw cap which attaches to the water bottle, etc.), In various forms, the splash skirt 450 can be made of plastic, metal, rubber, and/or paper, and can be integral to the housing 410 or can be a standalone unit.

Figure 5:
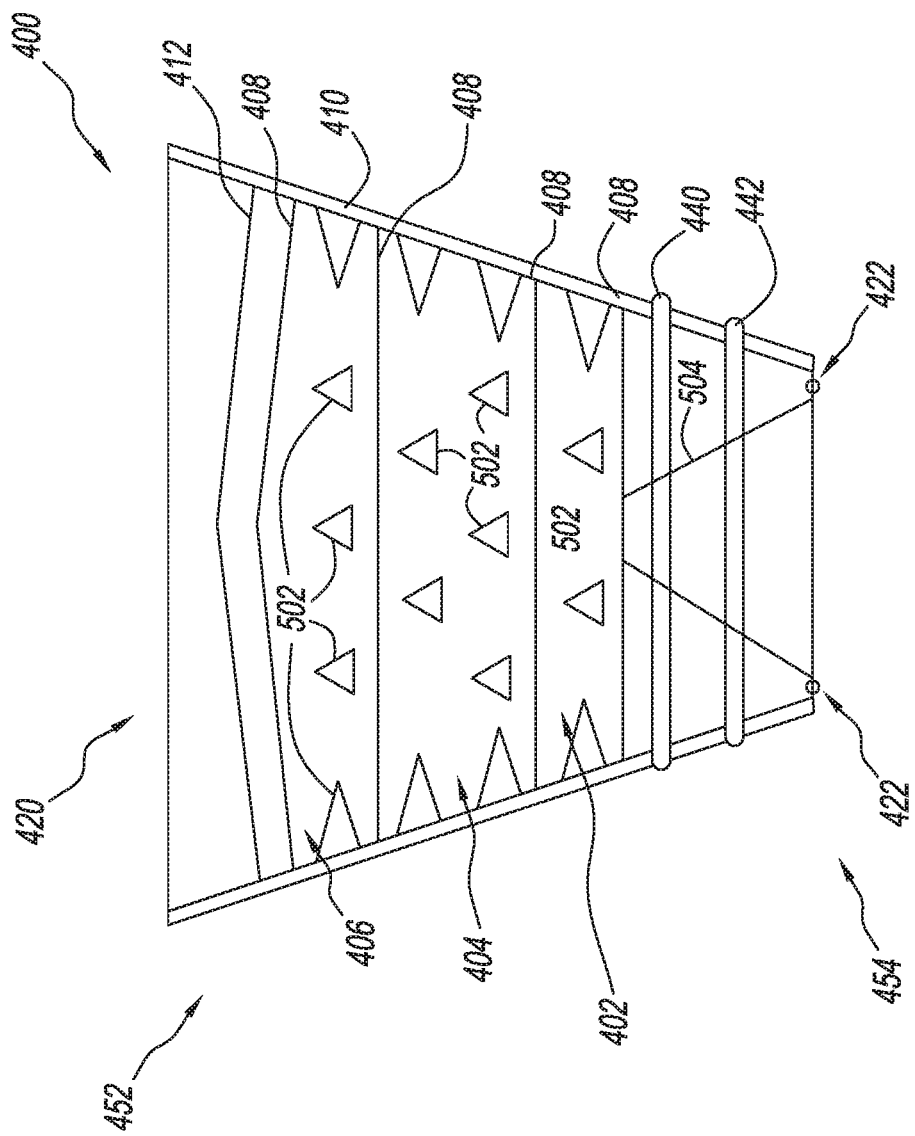
FIG. 5 is a side, schematic view of the filter of FIG. 4.

A filter assembly 400 is located within an interior of the filter housing 410. The filter assembly 400 includes a plurality of filter discs 402, 404, and 406. The filter assembly 400 can additionally include a plurality of screens 408 and 412, which can serve as pre-filters. Referring now to FIG. 5, dirty water poured into an inlet 420 of the filter housing 410 first contacts screen 412, and flows therethrough. The screen 412 serves to catch large particles. In one form, the screen 412 is a coarse 70-mesh screen. Once the water filters through screen 412, the water contacts screen 408 and flows through screen 408. The screen 408 is of a micro screen, for example 90-mesh, to filter out small particulate. In various forms, the screens 412 and 408 can be included in a single filter disc, in two distributed filter discs, or can take any other form such that screens 412 and 408 can be removed from the filter housing 410 to permit access to filter discs 402, 404, and 406. Additionally, the screen mesh sizes can be varied depending upon the specific application and the types of particulate likely to be encountered in water to be filtered.

After the water flows through the screens 412 and 408, gravity flows the water through filter disc 406. The filter disc 406 contains a filtration media to remove heavy metals from the water flowing. The filtration media included on this filter disc 406 is a KDF media. The purpose of the KDF media is to remove the metals in the water, such as lead, chromium, mercury, and the like. In one form, KDF media is a media of 55% zinc and 45% copper. However, it is contemplated that other media capable of removing heavy metals could be utilized for filter disc 406.

Filter disc 404 is located downstream of filter disc 406. The filter disc 404 holds an activated carbon media. This activated carbon helps to provide a "fresh" taste and smell to the water. The carbon media located in filter disc 404 also removes organics, such as volatile or organic compounds that may be in the water.

Filter disc 402 is located downstream from filter disc 404 and includes a disinfectant media. As was discussed above, this disinfectant media kills or traps bacteria, virus, and other microorganisms. Once the water passes through filter disc 402, it exits the filter assembly 400 via a plurality of outlet holes 422 and can enter the water bottle 430.

In one form, in addition to filtration media, filter discs 402, 404, and 406 each can include one or more micro screens 408. It is contemplated that these micro screens 408 can be utilized to retain the media in each of the filter discs.

The filter discs 402, 404, and 406 are depicted as having diffusers 502. Diffusers, synonymous with deflectors, directors, disruptors, are utilized to slow down the speed of fluid flow by redirecting a fluid type material. These diffusers help increase time it takes for the water to flow through each of the filter discs 402, 404, and 406 to increase the efficiency of the media contained within the respective discs. The diffusers 502 can be manufactured of plastic, metal, rubber, or paper and having a variety of geometrical shapes.

Located near the lower portion 454 of the housing 410 is a conical director 504. The conical director 410 can take on various forms to slow, or restrict, the flow of fluid through the filter 400. The conical director 410 forces the fluid outward toward the outlets 422.

The filter discs 402, 404, and 406 are sealingly engaged with an inside wall of the filter housing 410. This sealing engagement can take a variety of forms, such as a rubber sealing element to ensure that the water will pass through the filter discs 402, 404, and 406, rather than between the filter discs and the inside wall of the filter housing 410.

As is illustrated, the filter housing 410 is substantially frustoconical in shape. In one form, each of the filter discs 402, 404, and 406 are also frustoconical in shape. It has been discovered that filter discs having a narrower outlet, relative an inlet, utilize a higher percentage of the media included therein than filter discs which do not include a taper. Disc 402 has the smallest diameter of the filter discs and is inserted into the filter housing 410 first. Disc 402 will go into the housing until an outer perimeter of the disc 402 sealingly presses against the inside wall of the filter housing 410, thereby preventing the disc 402 from going into the housing further. The disc 404 has a larger diameter than disc 402, and is inserted into the filter housing 410 in a similar manner. The disc 406 has a larger diameter than the disc 404, and is also inserted in a similar manner.

Figure 6:
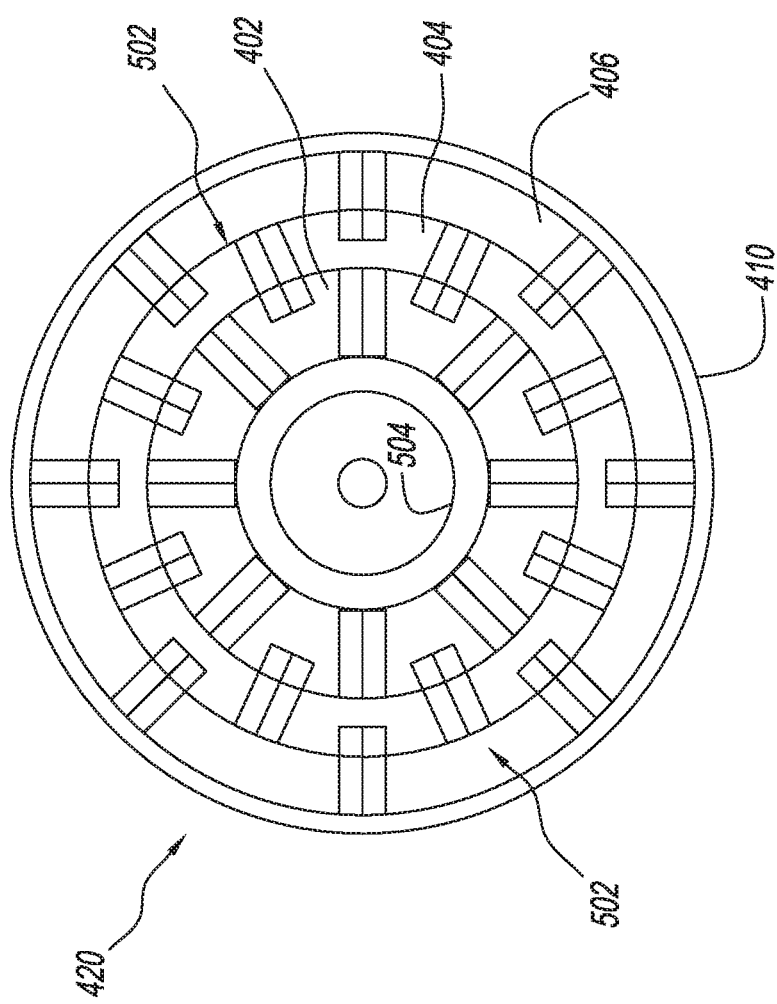
FIG. 6 is a top view of the discs of the filter of FIGS. 4 and 5, showing the discs situated so that the diffusers thereof are offset between adjacent discs.
Figure 7:
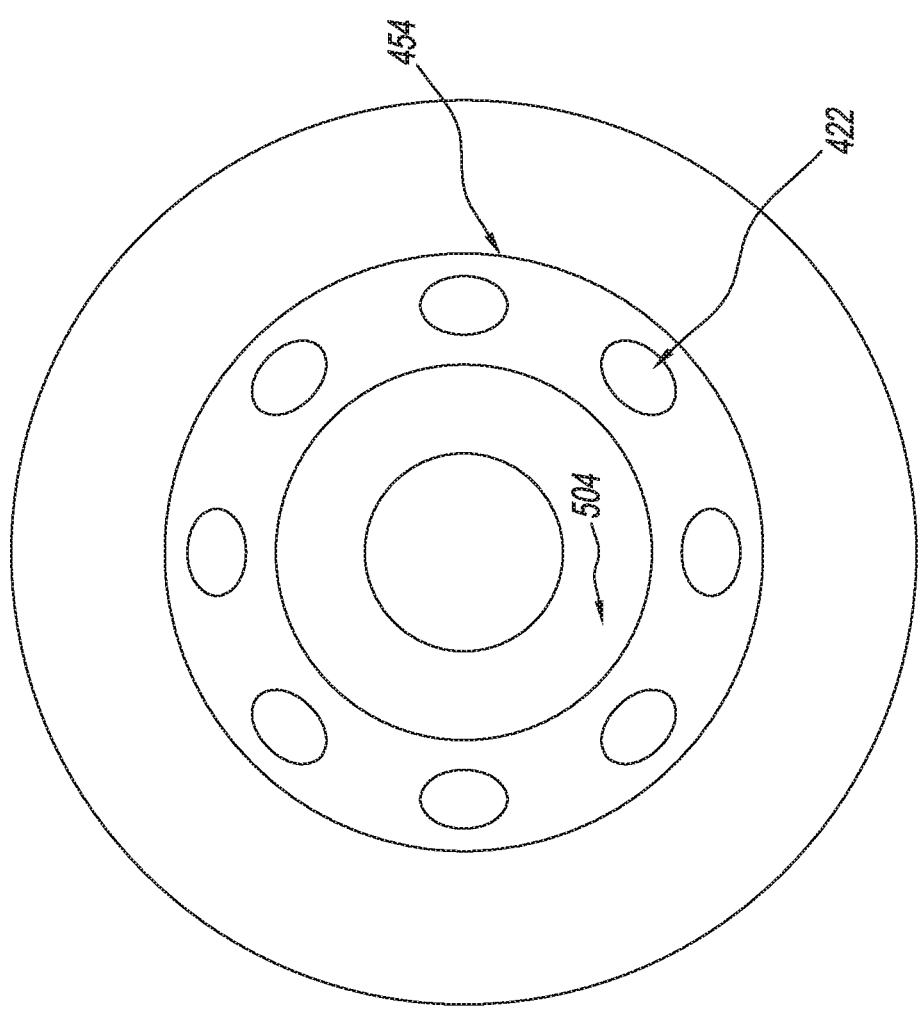
FIG. 7 is a bottom view of the filter of FIG. 4.

FIG. 6 is a top view of the discs 402, 404, 406 in a stacked orientation being situated so that the diffusers 502 thereof are offset between adjacent discs. FIG. 7 depicts a bottom view of the filter housing 410, depicting the outlet apertures 422.

Figure 8:
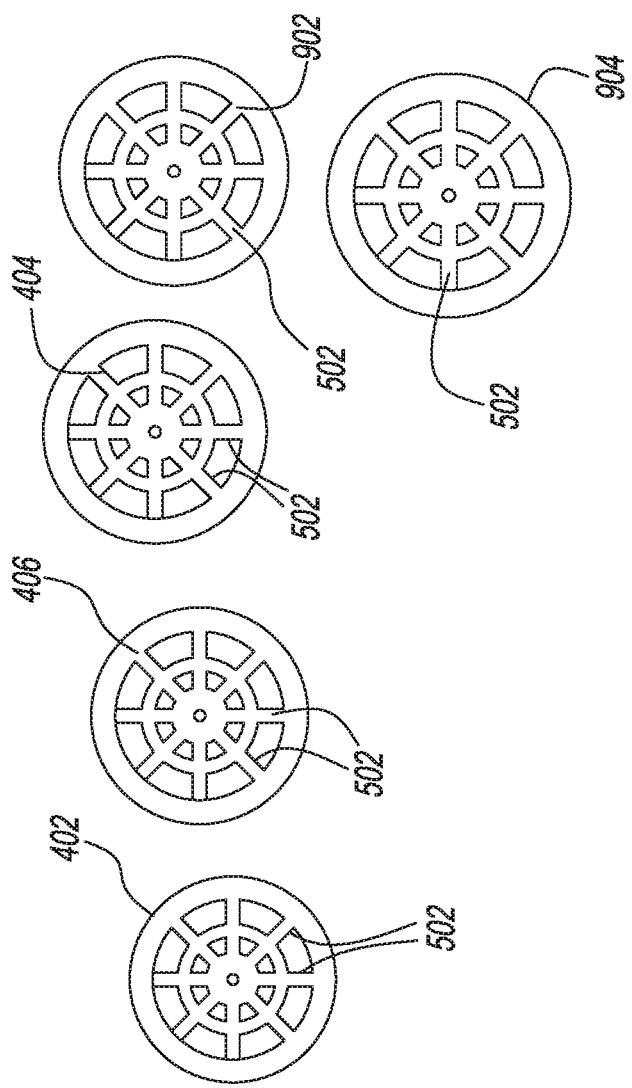
FIG. 8 is a top view of five exemplary media and filter-containing discs.

FIG. 8 depicts a top view of the five media and screen-containing discs of the present invention. The filter disc 904 is depicted as including screen 412 and the filter disc 902 is depicted as including screen 408. Each of the filter discs 402, 404, 406, 902, and 904 includes diffusers 502, depicted as plurality of spokes, an outer ring, and a middle ring. Each of the spokes has a generally triangular cross-sectional area, so as to provide a first and second downwardly sloped surface, with a generally planar, and horizontally disposed bottom surface. These "sloped surfaces" are also present on the middle ring member. The purpose of the sloped surfaces is to slow down the passage of water therethrough, and also to distribute the water outwardly. The sloped surface has surprisingly managed water so that the water does not follow a central path through the media. This helps to better distribute the water over the media, to improve the water to media contact, as the water flows through the media. It will be noted that all of the discs include these sloping surfaces, and are configured in a generally similar manner, but have different diameters so that the outer frusto-conical perimetral surface of the disc is snugly engaged with the inner conical surface of the conical housing 410.

Figure 9:
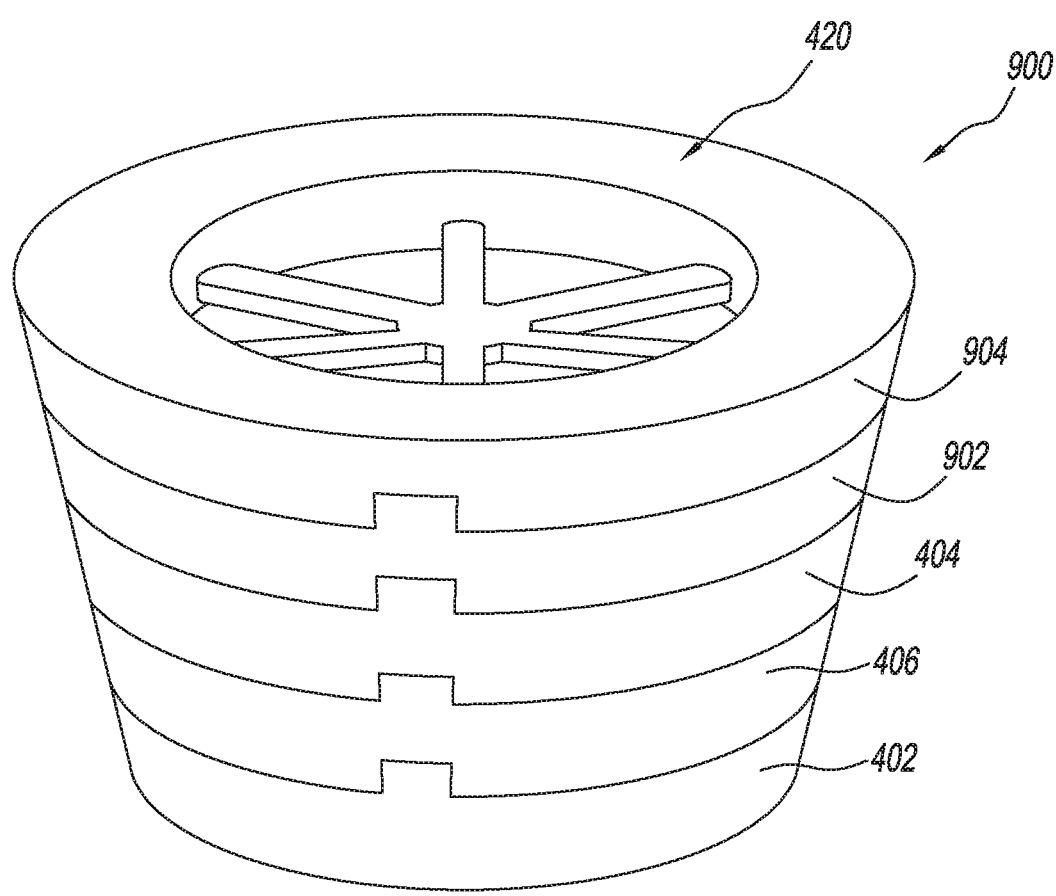
FIG. 9 is a side view of the five discs of FIG. 8 in a stacked configuration, showing the interlocking system that places the discs in a rotational orientation such that the spokes of the discs are not aligned with the spokes of the discs above and below each particular disc, so that the discs are thereby offset to increase the contact between the water and the media.

FIG. 9 is a side view of the five discs, in a stacked orientation outside of the housing 410. Illustrated at 902 and 904 are the tabs 902 are tab receiving members 904 which form an interlocking system that places the discs in a rotational orientation such that the diffusers 502 are offset between adjacent discs to increase the contact between the water and the media. Although a specific number of filter discs; as well as screen and/or media type included within the filter discs, has been discussed herein, it is contemplated that any number of filter discs containing a variety of medias, in a variety of ordered combinations can be utilized depending upon the desired application therefore.

In various forms, it is contemplated that one or more components of the gravity-fed filtration device could be collapsible and/or foldable.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A gravity-fed filtration system, comprising:
  a filter housing having a dirty water inlet located near an upper portion of the filter housing and a clean water outlet located near a lower portion of the filter housing, wherein an inner diameter of the filter housing decreases between the upper portion and the lower portion;
  a filter comprising a plurality of frustoconical discs removably stacked within an interior cavity of the filter housing, wherein an outer diameter of each of the plurality of frustoconical discs is closely received by the inner diameter of the filter housing, wherein a first disc of the plurality of frustoconical discs comprises a first plurality of radially extending diffusers, wherein a second disc of the plurality of frustoconical discs comprises a disinfectant media; and wherein the lower portion of the filter housing is configured to be disposed in a mouth of a water vessel.

2. The gravity-fed filtration system of claim 1, wherein the filter housing is substantially frustoconical in shape.

3. The gravity-fed filtration system of claim 1, wherein the second disc of the plurality of discs further comprises a second plurality of radially extending diffusers, wherein the second plurality of radially extending diffusers are offset relative the first plurality of radially extending diffusers.

4. The gravity-fed filtration system of claim 3, wherein the first disc further comprises an activated carbon, and wherein the first disc is located vertically above the second disc.

5. The gravity-fed filtration system of claim 4, wherein the disinfectant media is a composite material with a germicidal surface comprising: a support substrate; one or more micrometric aggregates of titanium oxide on the support substrate, the titanium oxide aggregates comprising chloride atoms; and one or more micrometric aggregates of silver attached to the chloride atoms of the titanium oxide aggregates, wherein the micrometric aggregates of titanium oxide with silver atoms have a germicidal activity.

6. The gravity-fed filtration system of claim 4, further comprising a third disc located vertically above the first disc, wherein the third disc comprises a heavy metal filter.

7. The gravity-fed filtration system of claim 1, wherein the lower portion of the filter housing further comprises a first rubber seal disposed around an exterior perimeter of the filter housing, wherein the first rubber seal is configured to engage with an interior surface of a mouth of a first bottle, wherein a second rubber seal is disposed around the exterior perimeter of the filter housing at a location vertically below the first seal, and wherein the second rubber seal is configured to engage with an interior surface of a mouth of a second bottle.

8. The gravity-fed filtration system of claim 1, further comprising a splash skirt extending outwardly from an exterior perimeter of the filter housing, wherein a lip of the splash skirt is configured to extend vertically below an upper edge of the mouth of the water vessel when the lower portion of the filter housing is inserted in the mouth of the water vessel.

9. A gravity-fed filtration apparatus, comprising:
a filter comprising a plurality of frustoconical discs removably stacked within an interior cavity of a substantially frustoconical filter housing, wherein an outer perimeter portion of each of the plurality of frustoconical discs is configured to sealingly engage with an inner diameter of the filter housing;
wherein a first disc of the plurality of frustoconical discs comprises a first plurality of radially extending diffusers and an activated carbon, wherein a second disc of the plurality of frustoconical discs comprises a second plurality of radially extending diffusers and a disinfectant media, and wherein the first disc and the second disc are stacked such that the second plurality of radially extending diffusers are offset relative the first plurality of radially extending diffusers; and
a splash skirt extending outwardly from an exterior perimeter of the filter housing configured to extend vertically below an upper edge of a mouth of a water vessel when a lower portion of the filter housing is inserted in the mouth of the water vessel.

10. The gravity-fed filtration apparatus of claim 9, wherein the disinfectant media further comprises an electroadsorptive media.

11. The gravity-fed filtration apparatus of claim 9, wherein the disinfectant media further comprises a composite material with a germicidal surface comprising: a support substrate; one or more micrometric aggregates of titanium oxide on the support substrate, the titanium oxide aggregates comprising chloride atoms; and one or more micrometric aggregates of silver attached to the chloride atoms of the titanium oxide aggregates, wherein the micrometric aggregates of titanium oxide with silver atoms have a germicidal activity.

12. The gravity-fed filtration apparatus of claim 9, wherein the plurality of frustoconical discs further includes a third disc comprising a third plurality of radially extending diffusers and a heavy metal filter.

13. The gravity-fed filtration apparatus of claim 12, wherein the plurality of frustoconical discs further comprises:
a fourth disc comprising a first mesh screen; and
a fifth disc comprising a second mesh screen, wherein the fifth disc is located upstream of the fourth disc so that water flowing through the filtration apparatus flows through the second mesh screen prior to flowing through the first mesh screen, and wherein the second mesh screen is coarser than the first mesh screen.

14. The gravity-fed filtration apparatus of claim 13, wherein the lower portion of the filter housing further comprises a first rubber seal disposed around an exterior perimeter of the filter housing, wherein the first rubber seal is configured to engage with an interior surface of the mouth of the water vessel, wherein a second rubber seal is disposed around the exterior perimeter of the filter housing at a location vertically below the first seal, and wherein the second rubber seal is configured to engage with an interior surface of a mouth of a second water vessel.

15. A gravity-fed filtration apparatus, comprising:
a filter housing having a water inlet near an upper portion of the filter housing and a water outlet near a lower portion of the filter housing;
a water filter comprising a plurality of discs removably stacked within an interior cavity of the filter housing between the water inlet and the water outlet, wherein an outer perimeter portion of each of the plurality of discs sealingly contacts an inner surface of the filter housing, wherein a first disc of the plurality of discs comprises a first plurality of diffusers and a disinfectant media, wherein a second disc of the plurality of discs comprises a mesh; and
wherein the plurality of discs further comprise a plurality of frustoconical discs, wherein the filter housing is substantially frustoconical in shape, and wherein an inner diameter of the filter housing decreases between the upper portion and the lower portion; and
wherein the lower portion of the filter housing is configured to be disposed in a mouth of a water vessel.

16. The gravity-fed filtration apparatus of claim 15, wherein the first plurality of diffusers further comprises a first plurality of radially extending diffusers.

17. The gravity-fed filtration apparatus of claim 16, wherein a third disc of the plurality of frustoconical discs further comprises a second plurality of radially extending diffusers and an activated carbon, wherein a fourth disc of the plurality of frustoconical discs further comprises a third plurality of radially extending diffusers and a heavy metal filter, and wherein the first plurality of radially extending diffusers, the second plurality of radially extending diffusers, and the third plurality of radially extending diffusers are offset.

18. The gravity-fed filtration apparatus of claim 17, wherein a diameter of the first disc is less than a diameter of the third disc, wherein a diameter of the third disc is less than a diameter of the fourth disc, and wherein a diameter of the fourth disc is less than a diameter of the second disc.

19. The gravity-fed filtration apparatus of claim 17, further comprising:
- a splash skirt extending outwardly from the filter housing, wherein a lip of the splash skirt is configured to extend vertically below an upper edge of the mouth of the water vessel when the lower portion of the filter housing is inserted in the mouth of the water vessel; and
- a first rubber seal disposed around an exterior perimeter of the filter housing configured to engage with an interior surface of the mouth of the water vessel.

\* \* \* \* \*